(12) United States Patent  (10) Patent No.: US 7,619,192 B2
Sun et al.  (45) Date of Patent: Nov. 17, 2009

(54) DIRECT BACKLIGHT MODULE USING OPTICAL FEEDBACK

(75) Inventors: Ching-Cherng Sun, Jhongli (TW); Tsung-Hsun Yang, Jhongli (TW); Chih-To Hsieh, Jhongli (TW)

(73) Assignee: National Central University, Jhongli (TW)

( * ) Notice: Subject to any disclaimer, the term of this patent is extended or adjusted under 35 U.S.C. 154(b) by 0 days.

(21) Appl. No.: 11/892,410

(22) Filed: Aug. 22, 2007

(65) Prior Publication Data

US 2008/0258040 A1   Oct. 23, 2008

(51) Int. Cl.
*G01J 1/32* (2006.01)
(52) U.S. Cl. ............... 250/205; 250/228; 250/239; 362/238; 362/561
(58) Field of Classification Search .......... 250/216, 250/205, 228, 239; 362/238, 240, 249, 555, 362/561, 583; 315/150
See application file for complete search history.

(56) References Cited

U.S. PATENT DOCUMENTS

2007/0170449 A1* 7/2007 Anandan .................. 257/98

\* cited by examiner

*Primary Examiner*—Kevin Pyo

(57) ABSTRACT

A direct-light-type backlight module uses optical feedback to control point light sources for obtaining a default luminance. Each point light source drives a section in a cyclic time domain to emit a light. A photo detector detects a brightness and the brightness is thus controlled by the optical feedback from the photo detector.

11 Claims, 3 Drawing Sheets

DIRECT BACKLIGHT MODULE USING OPTICAL FEEDBACK

FIELD OF THE INVENTION

The present invention relates to a backlight module; more particularly, relates to monitoring the brightness of a section from a direct-light-type backlight module with time series and using feedback of the brightness to ensure the luminance reaching a default value.

DESCRIPTION OF THE RELATED ARTS

Components of an LCD comprise a crystal panel and a backlight module, whose manufacture technologies are very mature. Since the crystal panel does not emit light, the backlight module is required to provide light with evenness.

In a traditional backlight module, light sources have certain lifetimes separately and so luminance decay rates varies. After a period of time of use, defects like insufficient luminance, white balance shift, uneven luminance on a light output surface, etc. are inevitably happen.

Although some prior arts use photo detectors for control by using feedback, various photo detectors are used for various light sources, which results in high cost. Hence, the prior arts do not fulfill all users' requests on actual use.

SUMMARY OF THE INVENTION

The main purpose of the present invention is to monitor the brightness of a direct-light-type backlight module and using a feed back to ensure the luminance, white balance and evenness reaching default values.

To achieve the above purpose, the present invention is a direct backlight module using optical feedback, comprising a substrate; a plurality of packaged optical components on the substrate; a plurality of mixed light chamber over the optical component; and a circuit board outside connected to the substrate, where the optical component is obtained by packaging at least one point light source and a photo detector and is put in a direct-light-type backlight module; each point light source drives a section in a cyclic time domain; the photo detector is driven in time series for a real-time detection on different brightness of the point light source of the direct-light-type backlight module in different section; the data obtained by the detection are used as feedback for the circuit board for control; and, thus, only one photo detector is required to monitor different point light source for reaching a default luminance value. Accordingly, a novel direct backlight module using optical feedback is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
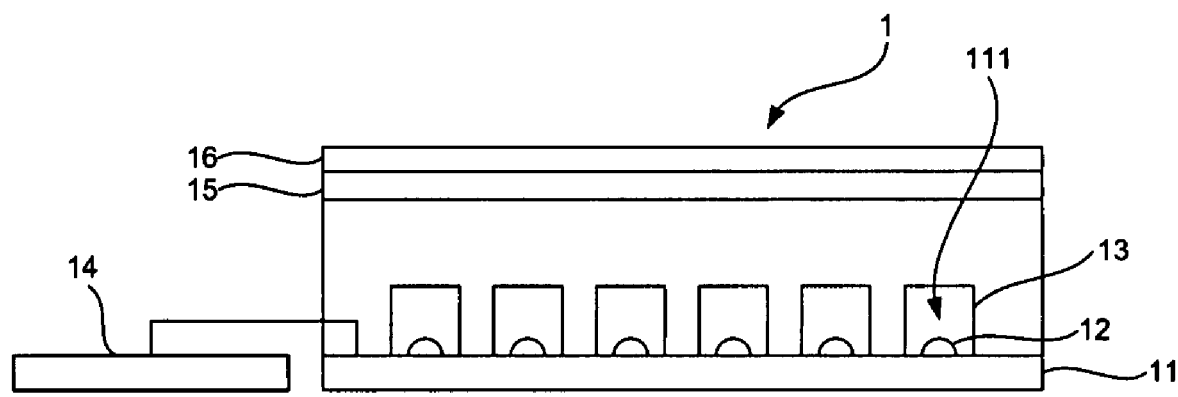
FIG. 1 is the view showing the preferred embodiment according to the present invention.
Figure 2:
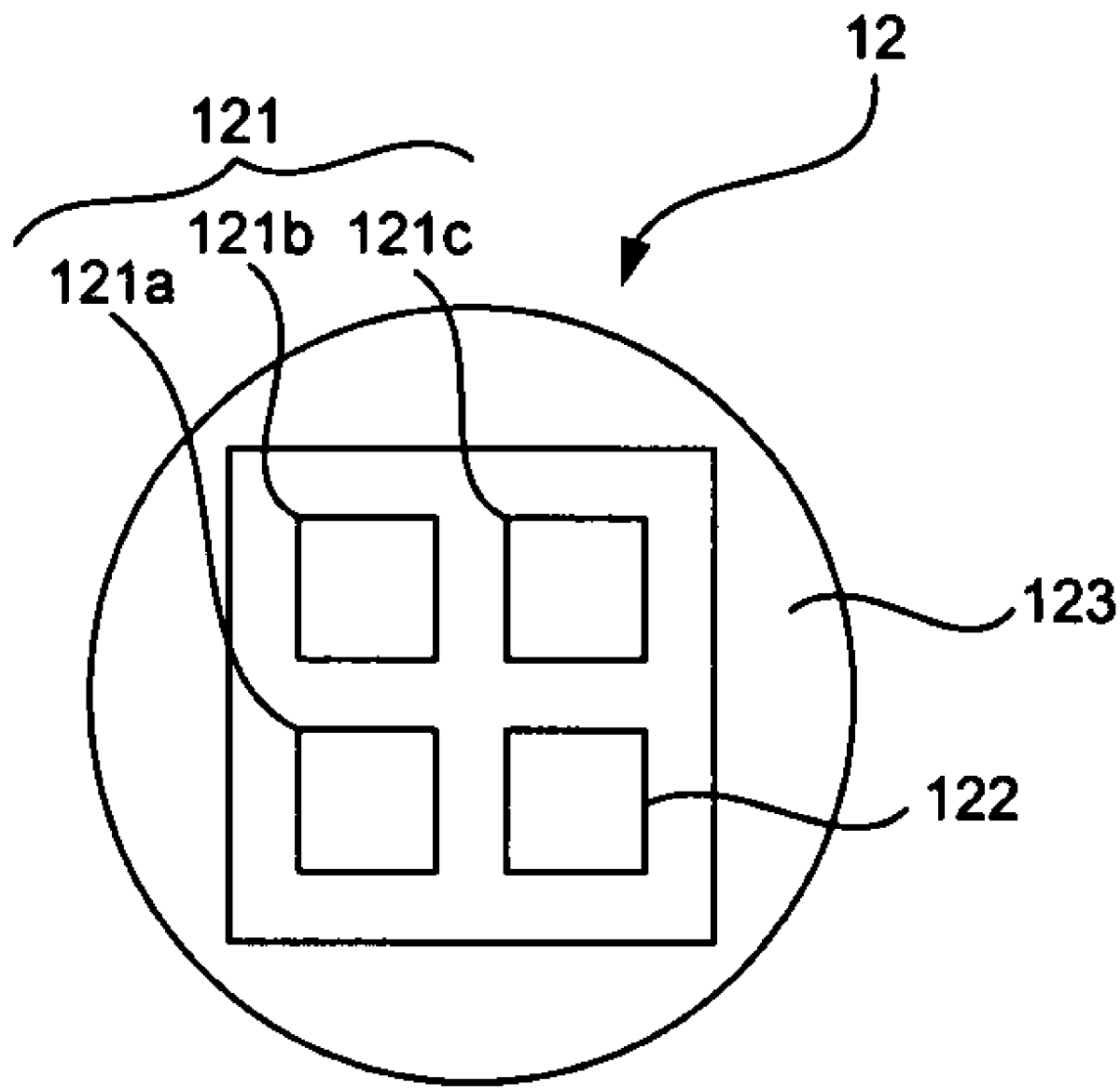
FIG. 2 is the enlarged view showing the optical component.
Figure 3:
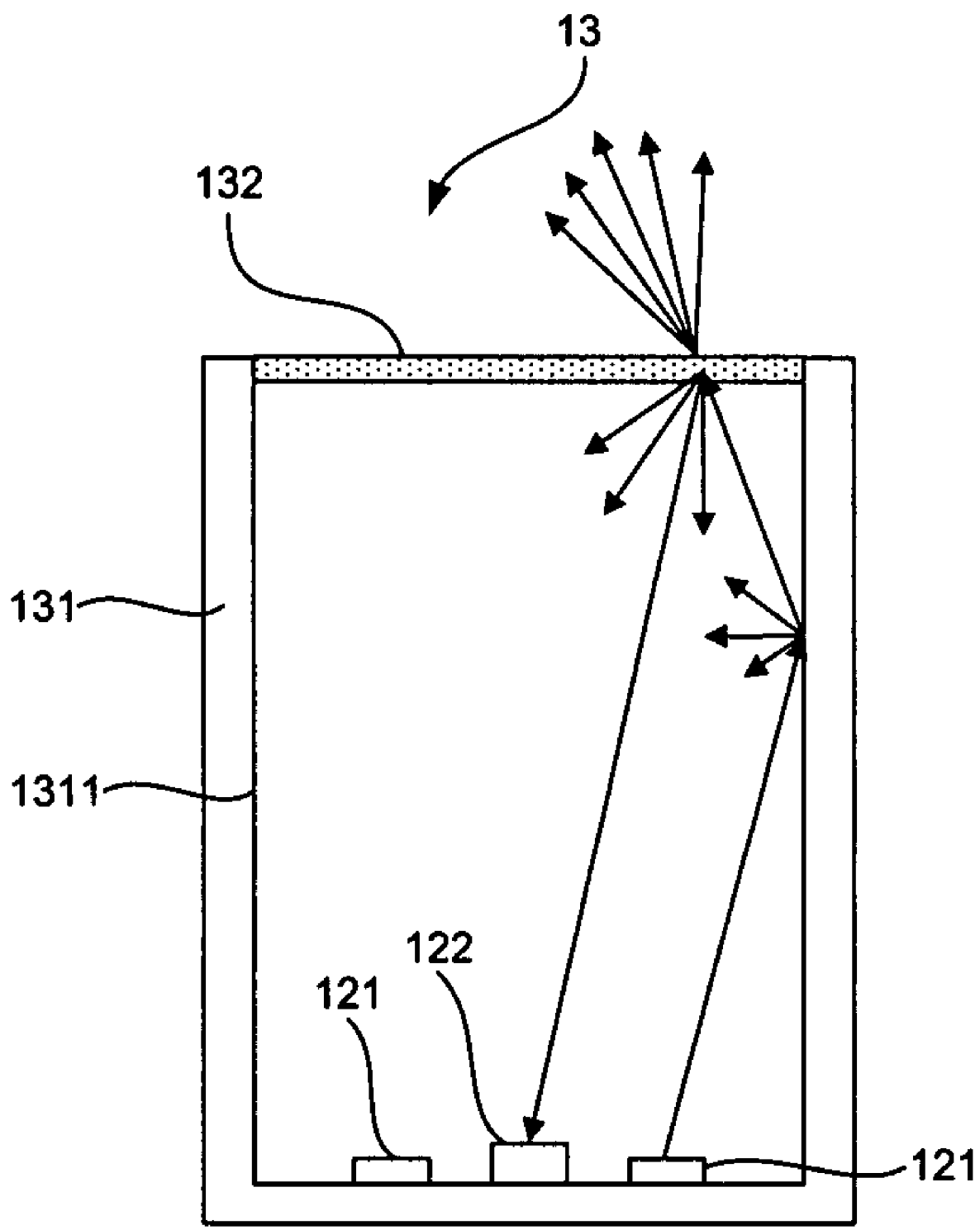
FIG. 3 is the view showing the mixed light chamber.

Please refer to FIG. 1 to FIG. 3, which is a view showing a preferred embodiment according to the present invention; an enlarged view showing an optical component; and a view showing a mixed light chamber. As shown in the figures, the present invention is a direct backlight module using optical feed back, comprising a substrate 11, a plurality of packaged optical components 12, a plurality of mixed light chambers 13 and a circuit board 14, where the brightness of a section from a direct-light-type backlight module 1 is monitored with time series and feedback of the brightness is used to ensure the luminance reaching a default value.

The substrate 11 has a plurality of component allocating holes 111; the component allocating hole 111 has a plurality of packaged optical components 12; and, the optical components 12 comprise at least one point light source 121, a photo detector 122 and a seat 123, which are packaged together. The substrate 11 is linked to a circuit board 14. And, the point light source 121, like a light emitting diode (LED) 121a, 121b, 121c, is deposed in the component allocating hole 11 to be electrically connected with the circuit board 14 to be driven and controlled by the photo detector 122, like a photo diode, with feedback. Furthermore, the point light sources 112 in the component allocating holes 111 include a red point light source, a green point light source and a blue point light source.

The mixed light chamber 13 is deposed on the optical component 12. The mixed light chamber 13 has an inner highly reflective chamber wall 131 of a reflective material; and the highly reflective chamber wall 131 has a highly reflective diffusing surface 1311. The mixed light chamber has a diffusion film 132 at an opening to reflect some light to the photo detector 122.

The substrate 11 has a diffusion plate 15 and an optical film 16 at an upper side. Light is evenly diffused by the diffusion plate 15 above the mixed light chamber 13. And the optical film 16 over the diffusion plate 15 is a component having a prism structure or a multi-function optical film structure for improving an optical quality.

On using the present invention, the point light sources 121 and the photo detector 122 are packaged in the optical component 12 and are put in the direct-light-type backlight module 1 Each of the point light source 121 drives a section in a cyclic time domain. Then the light emitted is reflected with a wide diffusing angle range by the reflective diffusing surface 1311 of the inner highly reflective chamber wall 131 of the mixed light chamber 13 and the diffusion film 132 at the opening. Then a part of the light is reflected back to the photo detector 122 for a preliminary light mixing.

The photo detector 122 is driven in time series for a real-time detection to different brightness of the point light source 121 of the direct-light-type back light module 1 in different section. Then the data obtained are used as feedbacks for the circuit board 14 for control. Thus, only one photo detector 122 is required to monitor different point light source 121 for reaching a default luminance value. And a direct-light-type backlight module 1 obtains good conditions on luminance, white balance and evenness, where a procedure for producing LED needs neither big change nor high cost.

To sum up, the present invention is a direct backlight module using optical feedback, where the brightness of a section from a direct-light-type backlight module is monitored with time series and feedback of the brightness is used to ensure the luminance reaching a default value; and the direct-light-type backlight module obtains good conditions on luminance, white balance and evenness with a procedure for producing LED with no big change nor high cost.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A direct backlight module using optical feedback, comprising:
   a substrate, said substrate having a plurality of component allocating holes;
   a plurality of packaged optical components, said optical component deposing in said component allocating holes on said substrate, each optical component comprising a plurality of light sources, a photo detector and a seat, wherein said light sources, said photo detector and said seat are packaged together, said photo detector being configured to detect multiple light colors without color crosstalk;
   a plurality of mixed light chambers, said mixed light chamber reflecting light to said photo detector, said mixed light chamber being a preliminary light mixing device; and
   a circuit board, said circuit board driving said light sources time-sequentially and controlling said point light sources and said photo detector by using feedback.

2. The module according to claim 1, wherein said point light sources are light emitting diodes (LED).

3. The module according to claim 1, wherein said point light sources are selected from the group consisting of a red point light source, a green point light source and a blue point light source.

4. The module according to claim 1, wherein said photo detector is driven in time series to detect different brightness of said point light sources in different section without color crosstalk; and
   wherein said photo detector controls said different point light sources with feedback to obtain a default luminance value.

5. The module according to claim 1, wherein said photo detector is a photo diode.

6. The module according to claim 1, wherein said mixed light chamber has an inner reflective chamber wall of a reflective material.

7. The module according to claim 6, wherein said inner reflective chamber wall has a reflective diffusing surface.

8. The module according to claim 1, wherein said mixed light chamber has a diffusion film or diffusion plate at an opening of said mixed light chamber.

9. The module according to claim 1, wherein said substrate has a diffusion plate which extends above said substrate.

10. The module according to claim 9, wherein said diffusion plate has an optical film over said diffusion plate.

11. The module according to claim 10, wherein said optical film has a structure selected from a group consisting of a prism structure and a multi-function optical film structure.

* * * * *